United States Patent [19]

Kuhn et al.

[11] Patent Number: 5,042,882
[45] Date of Patent: Aug. 27, 1991

[54] MOWER DECK WHEEL BEARING SEAL MECHANISM

[75] Inventors: John B. Kuhn, Rubicon; Christopher S. Thorman, Beaver Dam, both of Wis.

[73] Assignee: Deere & Company, Moline, Ill.

[21] Appl. No.: 487,359

[22] Filed: Mar. 1, 1990

[51] Int. Cl.⁵ .............................................. B60B 37/10
[52] U.S. Cl. ................ 301/124 R; 384/416; 301/105 R
[58] Field of Search ................ 301/105 R, 111, 112, 301/114, 115, 116, 117, 122, 124 R, 125, 126, 131, 132, 134; 384/129, 152, 276, 416, 417

[56] References Cited

U.S. PATENT DOCUMENTS

| 267,872 | 11/1882 | Gambllee et al. | 384/416 |
| 833,707 | 10/1906 | Corcoran | 384/416 |
| 2,717,071 | 9/1955 | Cook | 301/122 X |
| 3,503,659 | 3/1970 | Boylan | 384/416 |
| 3,843,216 | 10/1974 | Campbell | 384/152 |
| 4,244,588 | 1/1981 | Langewisch | 301/132 X |
| 4,373,739 | 2/1983 | Klem | 384/420 X |
| 4,919,491 | 4/1990 | Heideman | 301/124 R |

OTHER PUBLICATIONS

John Deere Horicon Works; parts-catalog for 60" and 72" Mid-Mount Rotary Mowers, 70 Series—855, 955; published in the U.S. in 1989; one page labeled 30-10.
John Deere Horicon Works; parts catalog for 41" and 48" Rotary Mower; published in the U.S. in 1986; pp. 1, 9 and 20.

Primary Examiner—Russell D. Stormer

[57] ABSTRACT

A mechanism for mounting a wheel to a mower deck having a mounting arm carrying a bolt. First bushings fitted within the wheel rotate about a sleeve fixed to the bolt. Second bushings adjacent the first bushings transfer axial forces from the wheel to the mounting arm. The second bushing is recessed within the first bushings in one embodiment, and within the wheel in another embodiment. Seals are formed between the second bushing and the first bushing in one embodiment, and between the second bushing and the wheel in the other embodiment in order to keep dirt and debris from coming between the contacting surfaces during operation.

21 Claims, 2 Drawing Sheets

MOWER DECK WHEEL BEARING SEAL MECHANISM

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

1. Field of the Invention

The invention relates to mechanisms for mounting ground engaging wheels to mower decks for supporting the mower decks above the ground.

2. Description of the Prior Art

It is known to provide mowing devices with mower decks carried by wheels. Wheels referred to as gage wheels are attached to the decks for engaging the ground such that the deck can roll over the ground to yield a predetermined height of cut. Wheels are also provided on portions of the deck for engaging the ground when that portion of the deck encounters an irregularity such as a bump in the ground conditions. These wheels, called anti-scalp wheels, allow the deck to ride over the bump and thereby prevent vegetation from being scalped or cut at a height less than the predetermined height when irregularities or bumps are encountered.

Many conventional gage and anti-scalp wheels provide a mounting arm attached to the deck and an axle carried by the mounting arm. The wheel is carried for rotation on the axle. As the wheel rolls straight ahead over the ground it encounters radial loads. The wheel is subjected to axial loads, or forces having direction parallel to the axis of the axle, as the wheel rolls over the ground during a turn. These axial forces are transmitted from the wheel to the mounting arm, or from the wheel to the axle to the mounting arm. Various mechanisms have been developed to attach these wheels to the mounting arm such that the axial forces are properly transmitted to the mounting arm.

One type of prior art wheel mounting provides a mounting arm attached to the deck. A bolt acts as an axle and is carried by the mounting arm. The wheel is rotatably mounted directly on the bolt. A washer is positioned on the bolt between the wheel and the mounting arm. The wheel transfers the above described axial loads to the washer, which in turn transfers the forces to the mounting arm. Similarly, the wheel can transfer axial loads in the other direction to the head of the bolt, which in turn transfers the force through the longitudinal portion of the bolt to the mounting arm. However, the surfaces of contact between the wheel and the washer, and between the wheel and the bolt head are exposed to the dirt and debris of the mower's environment. Dirt and debris can therefore get caught between the contacting surfaces and cause the parts to wear as the parts rub against each other during operation. Clearance between the parts is created as the parts wear, which causes the wheel to wobble during operation. Noise is thereby created and precision is lost in the adjustment of the height of cut.

A second type of conventional mounting device provides a mounting arm through which a bolt is carried. A sleeve rotates on the bolt and is fixed for rotation with the wheel. A washer is positioned on the bolt between the sleeve and the mounting arm. Axial forces are transmitted from the wheel to the sleeve, which in turn presses against the washer. The washer then transfers this force to the mounting arm. This type of mounting is similarly prone to the entrance of dirt between the contacting surfaces of the sleeve, washer, and mounting arm. Similarly, dirt may enter between the contacting surface between the sleeve and the head of the bolt. This entrance of dirt can cause wear, noise, and loss of fine adjustment as described above.

A third type of conventional mounting provides a mounting arm and an axle bolt. Metal sleeves or bearings are carried on the bolt. A tube is fitted over the sleeves or bearings and is fixed for rotation with the wheel. Grease seals are positioned on each side of the wheel and form a seal between the tube and the axle. Lubricant can thereby be kept between the seals to lubricate the metal sleeves or bearings during operation. The tube extends outwardly from the seals to abut a washer positioned against the mounting arm. The wheel transfers axial forces through the tube to the washer, which further transfers the force to the mounting arm. At the end of the axle opposite the mounting arm a washer is positioned between the tube and a pin carried by the axle. Axial forces can also be transferred through the tube to this washer and pin. The axle then transfers the load to the mounting arm. This wheel mounting device can allow dirt and debris to enter between the contacting surfaces of the tube and washer. Wear can result, which can cause wobble, noise, and loss of fine adjustment of mower height. The resulting wobble can also cause the bearings to become damaged or nonoperational.

SUMMARY OF THE INVENTION

It is therefore desirable to provide a wheel mounting device that allows for the transfer of axial forces to a mounting arm or frame in such a manner that dirt and debris cannot enter the load transfer mechanism. Such a mechanism would increase the performance and operating life of the mounting device by reducing wear associated with introduction of dirt into the mechanism.

The preferred embodiment of the present invention provides a mounting arm attached to the deck for carrying a bolt. An elongated member and a washer or bushing are carried on the bolt between the mounting arm and a nut. A wheel is fitted with a pair of bushings that rotate about the elongated member. Axial loads are transferred from the wheel to the bushings, and then to a protruding portion of the elongated member, or to the washer. The loads are then transferred to the mounting arm. The surfaces of contact between the bushings and the protruding portion or washer are protected from dirt and debris by recessing the contacting surfaces within the wheel and by utilizing a seal or cap. The performance of the wheel is thereby improved.

DETAILED DESCRIPTION OF THE PREFERRED EMBODIMENT

Figure 1:
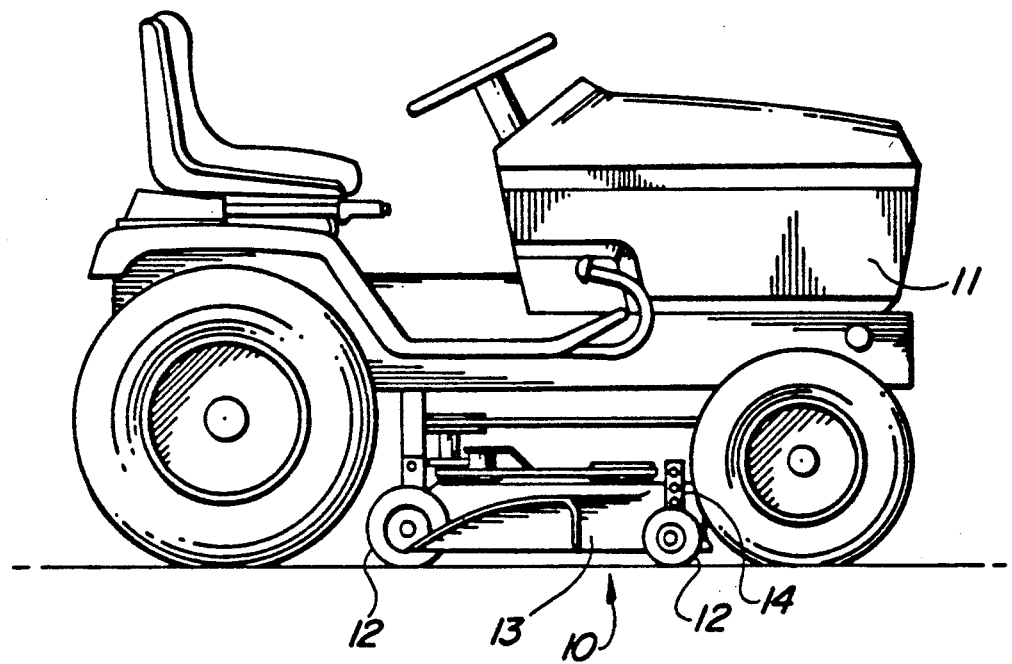
FIG. 1 shows a mowing vehicle with a mower deck supported by wheels according to the present invention.
Figure 2:
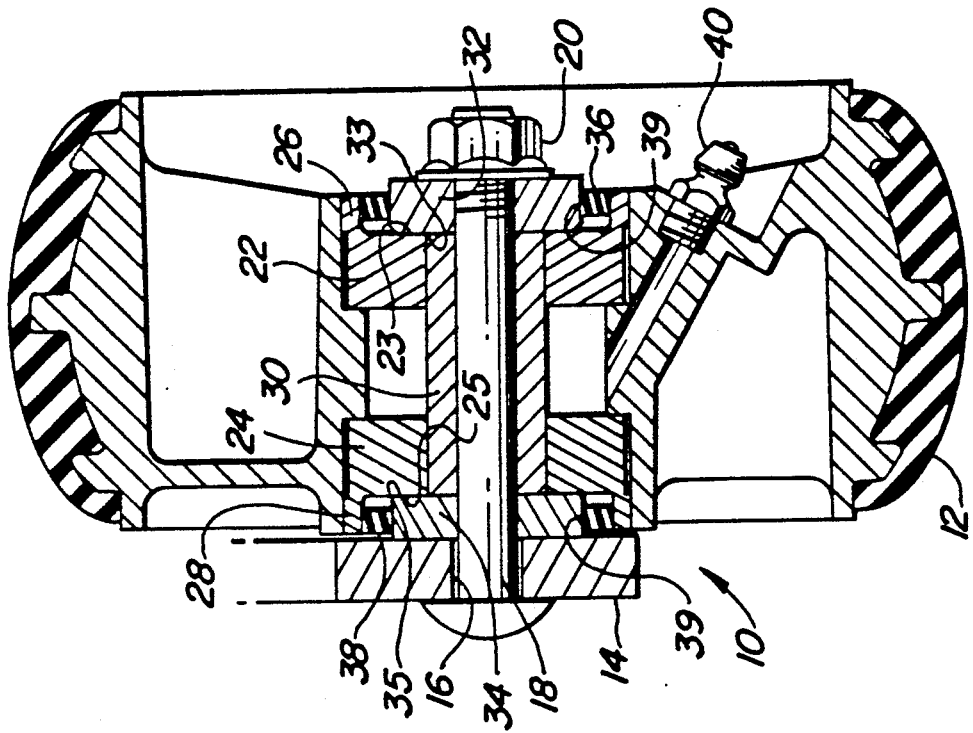
FIG. 2 shows a sectional view of one embodiment of the present invention.

Looking now to FIG. 1 there is shown a vehicle 11 that drives a mower deck 13. A mechanism 10 acts to mount wheels 12 to the deck 13 for supporting the deck 13 a predetermined height above the ground. FIG. 2 illustrates the mechanism 10 for mounting the wheel 12 to the mower deck 13 according to the present invention. The mechanism 10 is mounted to a mower deck 13 by a mounting arm 14 having an opening 16 through which an axle or bolt 18 passes. A nut 20 is threaded on the end of the bolt 18 opposite the mounting arm 14. The wheel 12 rotates about the bolt 18, and first surfaced members or right and left first bushings 22, 24 having extended portions 26, 28 are fitted within the wheel 12. The first bushings 22, 24 have radially extending surfaces 23, 25 and rotate about a sleeve 30 carried by the bolt 18. Second surfaced members or right and left second bushings 32, 34 having radially extending surfaces 33, 35 are carried by the bolt 18 and abut the sleeve 30. The nut 20 is tightened on the bolt 18 to place the second bushings 32, 34, the sleeve 30, and the mounting arm 14 in compression. Seals 36, 38 are provided between the radially outer diameter 39 of the second bushings 32, 34 and the extended portions 26, 28 that protrudes outwardly over the outer diameter of the second bushings 32, 34. A lubrication fitting 40 is provided in this embodiment to lubricate the surfaces within the mechanism 10 that rub against each other during operation.

Next, the operation of this first embodiment will be discussed. As the wheel 12 encounters the ground during straight forward operation, the wheel 12, first bushings 22, 24, and seals 36, 38 will rotate about the axis of the bolt 18. The nut 20, bolt 18, second bushings 32, 34, sleeve 30 and mounting arm 14 do not rotate during operation. During straight forward operation, radial loads imparted by the ground to the wheel 12 are transferred through the first bushings 22, 24 and sleeve 30 to the bolt 18. The bolt 18 then transfers these loads to the mounting arm 14. As the mower is executing a turn during operation, the ground imparts axial loads to the wheel 12, said loads having forces directed parallel to the axis of the bolt 18. The wheel 12 then pushes one of the first bushings 22, 24 into the respective second bushing 32 or 34. The first bushing surfaces 23, 25 press against respective second bushing surfaces 33, 35 to transfer axial loads. If the axial force applied to the wheel 12 is directed toward the mounting arm 14, then the left first bushing 24 transmits the force to the left second bushing 34, which in turn transmits the force directly to the mounting arm 14. If the axial force applied to the wheel 12 is directed away from the mounting arm 14, then the right first bushing 22 is forced against the right second bushing 32, which then transmits the force to the nut 20. The nut 20 then transfers the force to the bolt 18, which transfers the force to the mounting arm 14. The seals 36, 38 rotate with the first bushings 22, 24 during operation and prevent dirt and debris from entering the greased portion of the mechanism. Through positioning the seals 36, 38 outboard of the thrust surfaces, i.e. maintaining a clean thrust surface against which axial forces are registered, axial wear between the first bushings 22, 24 and the second bushings 32, 34 is not accelerated by the presence of dirt and/or other types of contamination. The wear resulting from the introduction of such contaminants can cause the wheel 12 to wobble noisily and eventually fail to rotate.

Figure 3:
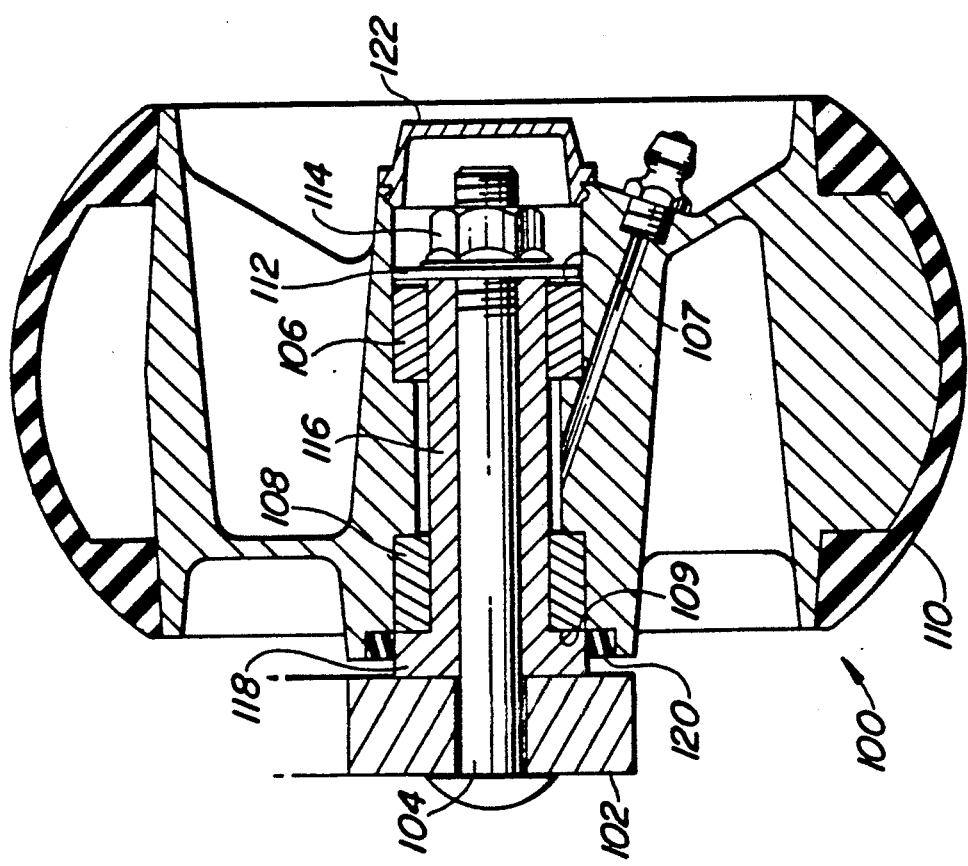
FIG. 3 shows a sectional view of the preferred embodiment of the present invention.

Looking now to FIG. 3, there is shown an alternative embodiment 100 and the best mode of the present invention. A mounting arm 102 attached to the mower deck 13 carries a bolt 104 that acts as an axle. Right and left first bushings 106, 108 having radially extending surfaces 107, 109 are fitted within the wheel 110 for rotation about the bolt 104. A right second bushing or washer 112 is provided on the bolt 104 between a nut 114 and the right first bushing 106. An elongated member 116 is provided having a protruding portion 118 that abuts the left first bushing 108. A seal 120 is provided between the outer diameter of the protruding portion 118 and the wheel 110. A cap 122 held by the wheel 110 covers the end of the bolt 104 opposite the mounting arm 102.

During operation of the mechanism as shown in FIG. 3 the wheel 110 encounters axial loads during turning. These axial forces are transferred from the wheel 110 to the left first bushing 108. The first bushing surface 109 then presses the protruding portion 118 into the mounting arm 102 to transfer axial loads. Axial loads are also transferred from the wheel 110 to the right first bushing 106, then to the washer 112, and into the nut 114. The nut 114 then transfers this load to the bolt 104, which transmits the force to the mounting arm 102. The area of contact between the left first bushing surface 109 and the protruding portion 118 is protected from the introduction of debris by being recessed within the wheel and by the presence of the seal 120 external to the contact surface. The area of contact between the right first bushing surface 107 and the washer 112 is also protected from dirt by the presence of the cap 122 carried by the wheel 110. In this way, the wear, noise, and failure resulting from debris entering between the contact surfaces is greatly reduced.

I claim:

1. An improved mounting mechanism usable with a mower deck adapted for cutting vegetation in a contaminated environment, said mechanism comprising:

a mounting arm connected to the mower deck;

an axle coupled with the mounting arm;

a wheel mounted on the axle for rotation about the longitudinal axis of the axle, said wheel being subject to forces having direction parallel to the longitudinal axis of the axle;

means positioned between the wheel and the mounting arm for transferring said forces from the wheel to the mounting arm, said transferring means further comprising:

a first surfaced member coupled with the wheel; and a second surfaced member coupled with the mounting arm, the surface of the second member being in contact with the surface of the first member;

said first and second surfaces having portions exending into the contaminated environment;

seal means positioned between the transferring means and the contaminated environment for preventing contaminants from entering between the first and second surfaces.

2. The invention as defined in claim 1 wherein:

the first surfaced member further comprises a first bushing coupled with the wheel for rotation therewith, said bushing having a surface portion;

the second surfaced member further comprises a second bushing having a radially outer diameter, said second bushing being carried by the axle in contact with the mounting arm, and having a surface portion in contact with the surface of the first bushing.

3. The invention as defined in claim 2 wherein the seal means further comprises a seal positioned between the outer diameter of the second bushing and the wheel.

4. The invention as defined in claim 2 wherein the seal means further comprises a seal positioned between the outer diameter of the second bushing and the first bushing.

5. The invention of claim 4, wherein:

the first bushing includes an axially extended portion that protrudes outwardly over the outer diameter of the second bushing; and said seal is positioned between the outer diameter of the second bushing and the axially extended portion of the first bushing.

6. The invention as defined in claim 2, wherein:

the first surfaced member further comprises a first bushing coupled with the wheel for rotation therewith, said bushing having a radially extending surface;

the second surfaced member further comprises a second bushing having a radially outer diameter, said second bushing being carried by the axle in contact with the mounting arm, and having a radially extending surface in contact with the radially extended surface of the first bushing.

7. A mechanism, as used in mounting a wheel to a vehicle operated in a contaminated environment, comprising:

a mounting arm supported by the vehicle;

an axle coupled with the mounting arm;

a wheel mounted on the axle for rotation about the longitudinal axis of the axle, said wheel being subject to forces having direction parallel to the longitudinal axis of the axle;

means positioned between the wheel and the mounting arm for transferring said forces from the wheel to the mounting arm, wherein the transfer means further comprises:

a first surfaced member coupled with the wheel;

a second surfaced member coupled to the mounting arm, said surface of the second member being in contact with the surface of the first member;

said first and second surfaces having portions extending into the contaminated environment; and seal means positioned between the transfer means and the contaminated environment for preventing contaminants from entering between the first and second surfaces of said transfer means.

8. The invention as defined in claim 7 wherein:

the first surfaced member further comprises a first bushing coupled with the wheel for rotation therewith, said bushing having a surface portion;

the second surfaced member further comprises a second bushing having a radially outer diameter, said second bushing being carried by the axle in contact with the mounting arm, and having a surface portion in contact with the surface of the first bushing.

9. The invention as defined in claim 8 wherein the seal means further comprises a seal positioned between the outer diameter of the second bushing and the wheel.

10. The invention as defined in claim 8 wherein the seal means further comprises a seal positioned between the outer diameter of the second bushing and the first bushing.

11. The invention as defined in claim 10 wherein:

the first bushing further comprises an extended portion that is radially aligned with the outer diameter of the second bushing;

the seal is positioned between the outer diameter of the second bushing and the extended portion of the first bushing.

12. The invention of claim 10, wherein:

the first bushing includes an axially extended portion that protrudes outwardly over the outer diameter of the second bushing; and said seal is positioned between the outer diameter of the second bushing and the axially extended portion of the first bushing.

13. A mechanism, as used in mounting a wheel to an implement operated in a contaminated environment, comprising:

a mounting arm connected to the implement;

an axle coupled with the mounting arm;

a wheel mounted on the axle for rotation about the longitudinal axis of the axle, said wheel being subject to forces having direction parallel to the longitudinal axes of the axle;

means carried by the axle on the side of the wheel opposite the mounting arm for preventing the wheel from coming off the axle;

means positioned between the preventing means and the wheel for transferring said forces from the wheel to the preventing means, whereby said forces are further transferred to the axle and the mounting arm, wherein the transfer means further comprises:

a first surfaced member coupled with the wheel;

a second surfaced member coupled to the mounting arm, said surface of the second member being in sliding contact with the surface of the first member;

said first and second surfaces having portions extending into the contaminated environment; and seal means positioned between the transfer means and the contaminated environment for preventing contaminants from entering between said transfer means.

14. The invention as defined in claim 13 wherein:

the first surfaced member further comprises a first bushing coupled with the wheel for rotation therewith, said bushing having a surface portion;

the second surfaced member further comprises a second bushing having a radially outer diameter, said second bushing being carried by the axle in contact with the preventing means, and having a surface portion in contact with the surface of the first bushing.

15. The invention as defined in claim 14 wherein the seal means further comprises a seal positioned between the outer diameter of the second bushing and the wheel.

16. The invention as defined in claim 14 wherein the seal means further comprises a seal positioned between the outer diameter of the second bushing and the first bushing.

17. The invention of claim 16, wherein:
the first bushing includes an axially extended portion that protrudes outwardly over the outer diameter of the second bushing; and
said seal is positioned between the outer diameter of the second bushing and the axially extended portion of the first bushing.

18. An improved mounting mechanism usable with a mower deck adapted for cutting vegetation in an environment containing dirt and debris, said mechanism comprising:
a mounting arm connected to the mower deck;
an axle coupled with the mounting arm;
a wheel mounted on the axle for rotation about the longitudinal axis of the axle, said wheel being subject to forces having direction parallel to the longitudinal axis of the axle;
means positioned between the wheel and the mounting arm for transferring said forces from the wheel to the mounting arm, said transferring means further comprising:
a first bushing coupled with the wheel for rotation therewith and having a first surfaced portion; and
a second bushing coupled with the axle and mounting arm and having a radially outer diameter and a second surfaced portion, the second surfaced portion being in contact with the first surfaced portion;
seal means for blocking dirt and debris from coming between the first and second portions which are in contact with each other, said seal means being positioned between the outer diameter of the second bushing and the first bushing.

19. A mechanism, as used in mounting a wheel to a vehicle operated in an environment containing dirt and debris, comprising:
a mounting arm supported by the vehicle;
an axle coupled with the mounting arm;
a wheel mounted on the axle for rotation about the longitudinal axis of the axle, said wheel being subject to forces having direction parallel to the longitudinal axis of the axle;
means positioned between the wheel and the mounting arm for transferring said forces from the wheel to the mounting arm, wherein the transferring means further comprises:
a first bushing coupled with the wheel for rotation therewith and having a first surfaced portion; and
a second bushing coupled with the axle and mounting arm and having a radially outer diameter and a second surfaced portion, the second surfaced portion being in contact with the first surfaced portion;
seal means for blocking dirt and debris from coming between the first and second portions which are in contact with each other, said seal means being positioned between the outer diameter of the second bushing and the first bushing.

20. A mechanism, as used in mounting a wheel to a vehicle operated in an environment containing dirt and debris, comprising:
a mounting arm supported by the vehicle;
an axle coupled with the mounting arm;
a wheel mounted on the axle for rotation about the longitudinal axis of the axle, said wheel being subject to forces having direction parallel to the longitudinal axis of the axle;
means positioned between the wheel and the mounting arm for transferring said forces from the wheel to the mounting arm, wherein the transfer means further comprises:
a first bushing coupled with the wheel for rotation therewith and having a first surfaced portion, and an axially extended portion; and
a second bushing coupled with the axle and mounting arm and having a radially outer diameter aligned with the axially extended portion of the first bushing, said second bushing having a second surfaced portion in contact with the first surfaced portion;
seal means for blocking dirt and debris from coming between the first and second surfaced portions which are in contact with each other, said seal means being positioned between the outer diameter of the second bushing and the axially extended portion of the first bushing.

21. A mechanism, as used in mounting a wheel to an implement operated in an environment containing dirt and debris, comprising:
a mounting arm connected to the implement;
an axle coupled with the mounting arm;
a wheel mounted on the axle for rotation about the longitudinal axis of the axle, said wheel being subject to forces having direction parallel to the longitudinal axis of the axle;
means carried by the axle on the side of the wheel opposite the mounting arm for preventing the wheel from coming off the axle;
means positioned between the preventing means and the wheel for transferring said forces from the wheel to the preventing means, whereby said forces are further transferred to the axle and the mounting arm, wherein the transfer means further comprises:
a first bushing coupled with the wheel for rotation therewith and having a first surfaced portion;
a second bushing coupled with the axle and mounting arm and having a radially outer diameter and a second surfaced portion, the second surfaced portion being in contact with the first surfaced portion;
seal means for blocking dirt and debris from coming between the first and second portions which are in contact with each other, said seal means being positioned between the outer diameter of the second bushing and the first bushing.

* * * * *